No. 855,918. PATENTED JUNE 4, 1907.
F. V. WHYLAND & C. P. HOLLISTER.
REGULATABLE POWER TRANSMISSION DEVICE.
APPLICATION FILED DEC. 19, 1906.
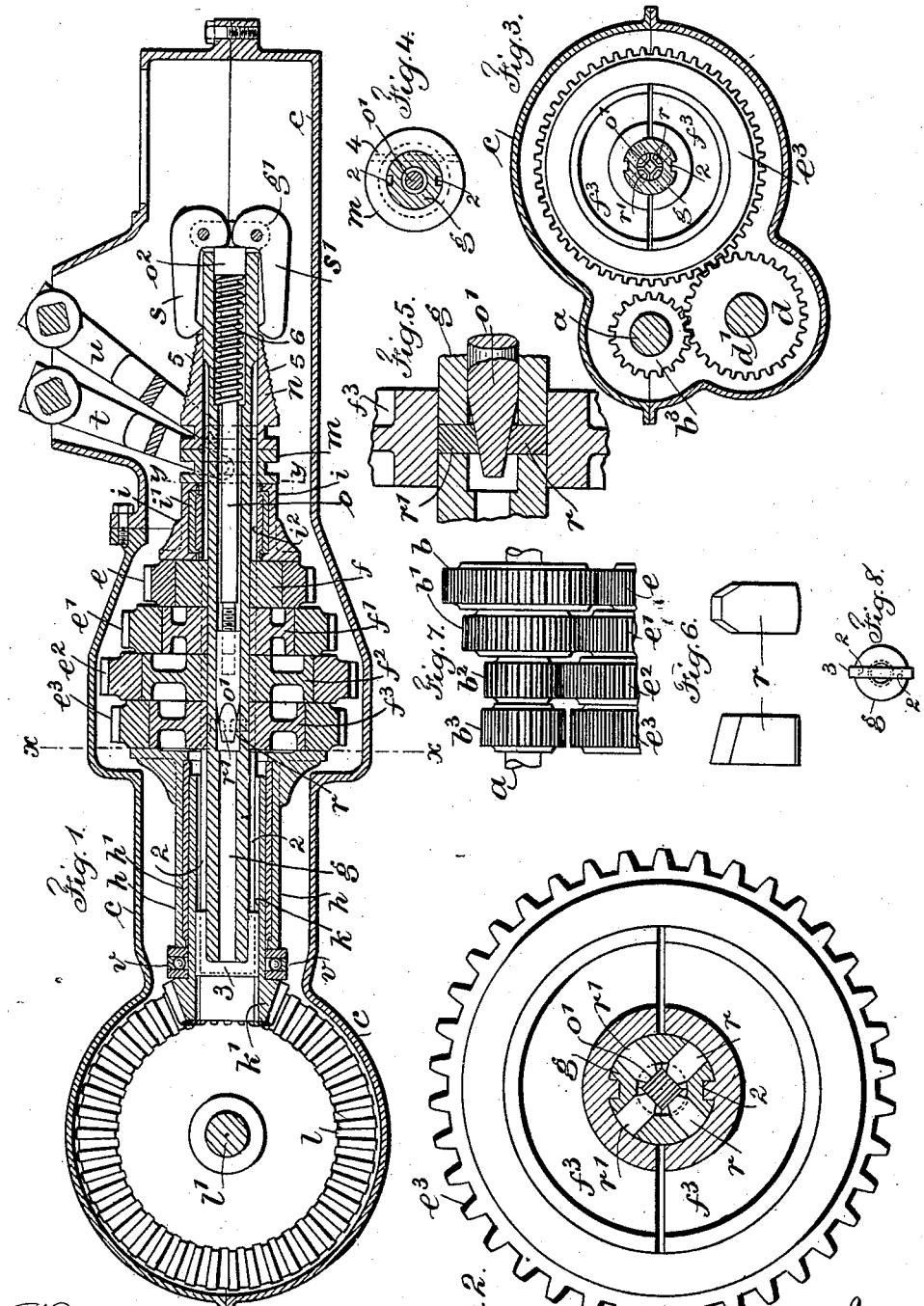

UNITED STATES PATENT OFFICE.

FRANK V. WHYLAND AND CLARENCE P. HOLLISTER, OF PITTSFIELD, MASSACHUSETTS.

REGULATABLE POWER-TRANSMISSION DEVICE.

No. 855,918.  Specification of Letters Patent.  Patented June 4, 1907.

Application filed December 19, 1906. Serial No. 348,522.

*To all whom it may concern:*

Be it known that we, FRANK V. WHYLAND and CLARENCE P. HOLLISTER, both citizens of the United States, residing in Pittsfield, in the county of Berkshire and State of Massachusetts, have invented an Improvement in Regulatable Power-Transmission Devices, of which the following is a specification.

Our invention relates to power transmission devices manually operated and regulatable, the power being transmitted from a prime mover and applicable to vehicles and machinery generally and especially to automobiles, and the same is designed as an improvement upon the devices shown and described in Letters Patent granted to us, December 13, 1904, No. 777,460. In the device of our said patent the action of the wedge blocks and segmental collars with the parts associated therewith are not at all satisfactory, and the object of our present invention is to obviate the difficulties thereof.

In carrying out our invention, and in combination with the shaft of a prime mover, a series or bank of gears secured to said shaft and a case surrounding said parts, we employ a longitudinally movable shaft preferably tubular and provided in opposite surfaces with longitudinal grooves, a series or bank of ring gears and internal friction segment collars which surround said tubular shaft side by side; said collars being provided with splines engaging said grooves by which the collars are turned with the shaft, the surrounding ring gears being free.

Suitable bearing sleeves are provided coming at opposite ends of the series of gears for holding the same together and as bearings for the tubular shaft, and we provide means for moving the tubular shaft bodily through the friction segment collars and devices connected with said tubular shaft for engaging a predetermined pair of said segmental collars so as to frictionally engage a ring gear within which said collars are placed so as thereby to receive the power of the power shaft and one of its gears and transmit the same to the device to be driven. The devices for performing this function are quite similar to those shown and described in our aforesaid patent, but they are more simple, are more positive in their action, are not at all liable to clog or become fixed so as to fail to return to an initial position when released, and are more readily actuated, responding more quickly to the power applied.

In the drawings, Figure 1 is a vertical longitudinal section and partial elevation representing the devices of our invention, Fig. 2 is a cross section at the dotted line $x, x$, Fig. 1 through the tubular shaft, wedge-bar and hub of the segmental collars with the ring gear and wedges in elevation, and without the casing. Fig. 3 is a cross section at said dotted line $x, x$, representing all of the parts on said line, the gears being in elevation. Fig. 4 is a cross section and elevation at the dotted line $y, y$,—Fig. 5 is a detached longitudinal section in large size showing the wedge blocks in the tubular shaft and the means for moving them into contact with the segmental collars. Fig. 6 represents by elevations in opposite directions one of the wedge blocks, Fig. 7 is a plan view representing the shaft of the prime mover or bank of gears thereon and parts of the bank of gears engaged thereby and Fig. 8 is an elevation at one end of the tubular shaft and its spline key.

$a$ represents the shaft of an engine or other suitable prime mover and $b\ b^1\ b^2\ b^3$ represent the gears of a series or bank mounted upon and secured to said shaft and of varying sizes and located within a suitable inclosing case $c$, which also holds the parts of the transmission device that are co-related thereto and which case is so constructed as to be adapted to hold sufficient oil to lubricate the parts at all times.

$d$ represents an auxiliary gear on an auxiliary shaft $d^1$ in suitable bearings in the case; said gear $d$ being in mesh with the gear $b^3$ of the aforesaid bank and with the gear $e^3$ of the bank of ring gears $e\ e^1\ e^2\ e^3$. The special function of this auxiliary gear being to reverse the direction of motion of the parts for the reason that the gears $e\ b\ e^1\ b^1$ and $e^2\ b^2$ are in mesh but $e^3$ and $b^3$ are only connected through the auxiliary gear $d$. Substantially, this device is referred to in our aforesaid patent. Within the ring gears $e\ e^1\ e^2\ e^3$ are the segmental collars $f\ f^1\ f^2\ f^3$, and $g$ is a tubular shaft passing through the said segmental collars and provided in opposite surfaces with longitudinal grooves 2 into which fit splines made with the said segmental collars. At one end of the tubular shaft the same is longitudinally and centrally slotted to receive a U-shaped spline-key 3.

Referring particularly to Fig. 1, $h$ $i$ represent sleeves with enlarged ends coming at the opposite ends of the series or bank of ring gears and segmental collars. These sleeves are secured in any well known or desired manner to the inner surface of the case $c$ and they serve to hold between their fixed limitations the said series of ring gears and segmental collars. These sleeves $h$ $i$ are provided with Babbitt metal linings; the sleeve $i$ and its lining $i^1$ being provided with a steel sleeve lining $i^2$ through which passes the said tubular shaft $g$. The sleeve $h$ and its lining $h^1$ receive the sleeve $k$, on one end of which is a bevel pinion $k^1$. The inner surfaces of this sleeve and bevel pinion are longitudinally grooved at opposite points and said grooves receive the opposite edges of the U-shaped spline key 3 of the tubular shaft $g$, thus connecting the said shaft for revoluble movement to the said sleeve and bevel pinion.

Adjacent to the bevel pinion $k^1$ is a bevel wheel $l$ on a transmission shaft $l^1$, which extends to the device or series of devices to be operated. At the other end of the tubular shaft and surrounding the same is a grooved collar $m$ secured to the said tubular shaft by a pin 4 placed transversely. Surrounding the tubular shaft and adjacent to the collar $m$ is a grooved cone $n$, the surface of the conical portion having circumferential grooves 5. Within the tubular shaft $g$, we employ a wedge bar $o$ and wedge end $o^1$ connected to said wedge bar and wedge blocks $r$ $r^1$ which extend radially from the axial center of the tubular shaft and at spaced apart intervals.

We have shown the wedge end $o^1$ with four inclined surfaces and we have also shown four wedge blocks,—see Figs. 2 and 3. These wedge blocks have inclined faces that bear upon the inclined faces of the wedge end $o^1$; they pass through the hollow shaft $g$ at spaced apart intervals and their outer ends bear against the inner surfaces of the segmental collars.

Around one end of the wedge bar $o$ is a helical spring 6 bearing at one end upon a shoulder of the said tubular shaft and at one end against a head $o^2$ of the wedge bar; the function of said spring being to normally hold the wedge bar and wedge end toward the right hand of Fig. 1, so as to remove pressure between the wedge end $o^1$ and the wedge blocks $r$ $r^1$. This tubular shaft at the right hand end, Fig. 1, is provided with opposite lugs $g^1$ in which are pivotally mounted bent levers $s$ $s^1$. The short arms of these bent levers bear against the outer end of the head $o^2$ and their long arms extend centrally and at opposite points along the protruding end of the said tubular shaft $g$ normally into proximity with the pointed end of the cone $n$.

We employ a rocking lever $t$ pivoted to the case and having a bifurcated end adapted to engage the opposite surfaces or sides of the grooved collar $m$, and we further employ a rocking lever $u$ adapted at its free end to likewise engage the groove of the cone end at its opposite sides.

We have also shown and prefer to employ a ball-bearing $v$ as an end-thrust between the bevel pinion $k^1$ and one end of the sleeve $k$.

From the foregoing it will be noticed that there is only one set of wedge blocks and one series of perforations of the tubular shaft receiving the same and in the operation of the device of our improvement the tubular shaft $g$ is longitudinally movable for predetermined distances so as to bring the said series of wedge blocks into engagement with either pair of the segmental collars $f$ $f^1$ $f^2$ or $f^3$, according to the power and speed desired of the transmission device and forward or backward direction to be employed.

The tubular shaft $g$, its spline key 3, collar $m$, cone $n$, wedge bar $o$, wedge end $o^1$, wedge blocks $r$ $r^1$, helical spring 6, head $o^2$, lugs $g^1$ and bent levers $s$ $s^1$, are all movable longitudinally by means of the rocking lever $t$ which engages the grooved collar $m$.

Fig. 1 shows the extreme position to the left in which the series of wedge blocks engage the segmental collar $f^3$ and ring gear $e^3$ and in which the collar $m$ comes up against the end of the fixed bearing sleeve $i$. To move these parts and to cause the wedge blocks to lock with either of the pairs of the collars $f$, $f^1$, $f^2$, $f^3$, the devices operating the rocking lever $t$ are moved to swing this lever to a predetermined extent. As soon as this movement has been made the parts are held in position and the rocking lever $u$ is then actuated, moving the grooved cone $n$ along over the surface of the tubular shaft $g$ and appreciably away from the collar $m$. In doing this, the free pointed ends of the long arms of the levers $s$ $s^1$ move up over the surface of the cone and engage one of the circumferential parallel grooves. In doing so, the short ends of these levers bearing against the head $o^2$ impart a longitudinal movement to the wedge bar $o$ and the wedge end $o^1$, causing an outward movement of the wedge blocks $r$ $r^1$ of the series and a gripping action to take place between the same and the under surfaces of the segmental collars and between the outer surfaces of the segmental collars and the inner surfaces of one of the ring gears, according to the position of the parts. This locks the predetermined ring gear to the tubular shaft and its rotation by means of the power shaft and one of the series or bank of gears connected thereto is transmitted to the tubular shaft $g$ and by the same and through the U-shaped spline key 3 to the bevel pinion $k^1$ and its sleeve $k$ and from the same to the bevel wheel $l$, its shaft $l^1$ and the device to be actuated thereby. To release these parts the cone $n$ is moved by the rocking lever $u$ in the opposite direction so as to free the bent levers $s$ $s^1$ and provide for their return to their initial position as shown in Fig. 1. This is accomplished by the expansion of the helical spring 6 swinging the said levers and simultaneously and longitudinally moving the wedge bar $o$ and the wedge end $o^1$ and release the wedge blocks $r$ $r^1$ from their grip upon a pair of the segmental collars. Thus the transmission of power from the power shaft to the devices to be actuated is stopped.

It will be apparent from the foregoing and the drawing, that the gears $b$ $e$ are the high-speed gears and the gears $b^2$ $e^2$ the low-speed gears; the gears $b^1$ $e^1$ being employed for an intermediate speed.

We have not herein shown the devices for actuating the rocking levers $t$ and $u$,—they are not important nor is the peculiar construction of these rocking levers important. The device of our present invention is simpler, quicker and more positive in its action and is better supported than the device of our aforesaid patent.

We claim as our invention:

1. In a power transmission device, the combination with a longitudinally movable tubular shaft having longitudinal grooves in its surface on opposite sides and manually operated devices for effecting said movement, of a plurality of two-part segmental collars surrounding said shaft and having splines formed therewith in the grooves of said shaft, a ring gear closely surrounding each of said collars, a series of wedge blocks extending through apertures in the said tubular shaft, with their outer surfaces adapted to come against the inner surfaces of the said segmental collars and means also manually operated for imparting an outward or radial movement to said wedge blocks.

2. In a power transmission device, the combination with a longitudinally movable tubular shaft having longitudinal grooves in its surface on opposite sides and manually operated devices for effecting said movement, of a plurality of two-part segmental collars surrounding said shaft and having splines formed therewith in the grooves of said shaft, a ring gear closely surrounding each of said collars, a series of wedge blocks extending through apertures in the said tubular shaft, with their outer surfaces adapted to come against the inner surfaces of the said segmental collars, a bar having a wedge-end connected therewith, provided with a series of inclined faces agreeing in number with the number of the wedge blocks, a spring for moving the said bar and wedge-end in one direction, a cone and bent levers for moving the same in the opposite direction.

3. In a power transmission device, the combination with a series of ring gears, a series of segmental collars fitting within the same, a power shaft and gears thereon meshing with and for revolving the said ring gears, of a longitudinally movable tubular shaft having a series of spaced apart radially placed apertures, a series of wedge blocks in said apertures, means for moving the said wedge blocks outwardly to bring their outer ends in contact with the inner surfaces of the said segmental collars and means for manually actuating the tubular shaft and moving the same together with the devices for actuating the wedge blocks to predetermined extents so as to bring the said wedge blocks into engagement with either one of the said segmental collars and ring gears.

4. In a power transmission device, the combination with a series of ring gears, and a series of segmental collars within the same, of a longitudinally movable tubular shaft fitting within the said segmental collars and fixed bearing sleeves coming at the opposite ends of the series of ring gears and collars for maintaining the same in position and a case for surrounding the parts and to which said bearings are connected for support.

5. In a power transmission device, the combination with a series of ring gears, and a series of internal segmental collars, of a longitudinally movable tubular shaft, a sleeve and bevel pinion connected therewith and in part surrounding the tubular shaft and internally grooved at opposite points, a U-shaped spline key secured centrally in the end of the tubular shaft and engaging the grooves of the said sleeve and bevel pinion, a bevel wheel and a transmission shaft connected therewith, to which the rotation of the bevel pinion is communicated.

6. In a power transmission device, the combination with a series of ring gears, segmental collars within the same and means for actuating the collars, of a longitudinally movable tubular shaft within the collars, bearing sleeves coming against opposite ends of said series of gears and collars, supports for the said sleeves, Babbitt metal linings to the said sleeves, a steel sleeve lining for one sleeve within the Babbitt metal lining and within which the tubular shaft moves, a sleeve within the Babbitt lining of the other bearing sleeve and surrounding the said longitudinally movable tubular shaft and a U-shaped spline key secured in the end of the shaft and engaging internal grooves in the latter sleeve, substantially as set forth.

Signed by us this 11th day of December, 1906.

FRANK V. WHYLAND.
CLARENCE P. HOLLISTER.

Witnesses:
WM. A. BURNS,
H. B. STILSON.